(12) United States Patent
Saderholm et al.

(10) Patent No.: US 6,805,374 B2
(45) Date of Patent: Oct. 19, 2004

(54) INFLATABLE CURTAIN CUSHION

(75) Inventors: Davin G. Saderholm, Brea, CA (US); Travis B. Hess, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/779,093

(22) Filed: Feb. 8, 2001

(65) Prior Publication Data

US 2002/0105173 A1 Aug. 8, 2002

(51) Int. Cl.$^7$ .............................................. B60R 21/16
(52) U.S. Cl. .................. 280/730.2; 280/729; 280/743.1
(58) Field of Search .............................. 280/729, 730.2, 280/743.1, 736, 741; 428/35.2, 36.9; 156/383, 423, 272.4, 293, 294, 275.1, 275.3, 275.7

(56) References Cited

U.S. PATENT DOCUMENTS

| | | | |
|---|---|---|---|
| 3,731,949 A | * 5/1973 | Radke | 182/138 |
| 5,423,273 A | 6/1995 | Hawthorn et al. | |
| 5,454,594 A | 10/1995 | Krickl | |
| 5,586,782 A | 12/1996 | Zimmerman, II et al. | |
| 5,765,863 A | 6/1998 | Storey et al. | |
| 5,797,621 A | 8/1998 | Ono | |
| 5,840,146 A | * 11/1998 | Woo et al. | 156/272.4 |
| 5,899,489 A | 5/1999 | Jost | |
| 5,906,391 A | 5/1999 | Weir et al. | |
| 5,921,576 A | 7/1999 | Sinnhuber | |
| 5,957,493 A | * 9/1999 | Larsen et al. | 280/730.2 |
| 5,968,304 A | * 10/1999 | Ragno et al. | 156/272.4 |
| 6,010,149 A | * 1/2000 | Riedel et al. | 280/730.2 |
| 6,019,390 A | 2/2000 | Keshavaraj | |
| 6,176,513 B1 | * 1/2001 | Neidert | 280/729 |
| 6,210,519 B1 | * 4/2001 | Heudorfer et al. | 156/292 |
| 6,217,060 B1 | * 4/2001 | Mangold et al. | 280/730.2 |
| 6,239,046 B1 | * 5/2001 | Veiga et al. | 280/728.1 |
| 6,290,253 B1 | * 9/2001 | Tietze et al. | 280/730.2 |
| 6,299,204 B1 | * 10/2001 | Keshavaraj | 280/743.1 |
| 6,338,498 B1 | * 1/2002 | Niederman et al. | 280/728.2 |
| 6,364,356 B1 | * 4/2002 | Keshavaraj | 280/743.1 |
| 6,458,724 B1 | * 10/2002 | Veiga et al. | 442/76 |

FOREIGN PATENT DOCUMENTS

| | | |
|---|---|---|
| DE | 199 26 076 A1 | * 12/1999 |
| DE | 200 07 937 U1 | * 8/2000 |
| DE | 199 34 245 A1 | * 2/2001 |

* cited by examiner

Primary Examiner—Ruth Ilan
(74) Attorney, Agent, or Firm—Sally J. Brown

(57) ABSTRACT

A novel safety restraint system especially well suited to protect occupants of a vehicle from lateral impact is described. One or more cushion portions are provided and installed to inflate between an occupant and a lateral surface, such as a door or side window. The cushion portions may be connected to an air source or to each other through the use of sail portions and supply tubes, which may be attached to the cushion portions by chemical bonding, adhesive bonding, sewing, RF welding, or any other suitable method. The cushion portions may have an interior coating of a urethane based substance, mated to a similar substance coating the exterior of a supply tube or sail portion. The cushion portions may then be RF welded to the sail portion or supply tube without restricting gas flow into the cushion portions. The sail portions and supply tubes are preferably fabricated from a material different from that used to form the cushion portions, so as to reduce the cost and weight of the safety restraint system.

27 Claims, 6 Drawing Sheets

INFLATABLE CURTAIN CUSHION

BACKGROUND OF THE INVENTION

1. The Field of the Invention

The present invention relates to inflatable safety cushions, or airbags, for vehicles. More specifically, the present invention relates to a novel airbag especially suited to protecting vehicle occupants from side impacts or rollovers, and a low-cost and convenient method for manufacturing, assembling, and installing such an airbag.

2. The Relevant Technology

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the ignition of an explosive charge. Expanding gases from the charge fill the airbags, which immediately inflate in front of the driver and passenger to protect them from impact against the windshield.

Side airbags have also been developed in response to the need for similar protection from impacts in a lateral direction, or against the side of the vehicle. However, side airbags known in the art have a number of disadvantages. First of all, many known side airbags have insufficient gas retention capability to protect a vehicle occupant beyond a brief initial impact. The seams created during fabrication of the airbag, and sometimes the fabric of the airbag itself, are often too permeable to retain gas for any length of time. Many taller vehicles, such as sport utility vehicles, are prone to rollover during tighter turns. The rollover is not just a single impact, but a series of jarring motions, all of which are potentially dangerous to vehicle occupants. Many previously known airbags will deflate before the vehicle comes to a stop, a process that could take several seconds.

Furthermore, many airbags are too bulky for convenient installation and use in a vehicle. The airbag must be mounted some distance from a passenger because the airbag requires space to inflate. The speed at which the airbags in general, and especially side airbags, must deploy to adequately protect people requires that they inflate with considerable speed and force. Placement too close to a vehicle occupant increases the risk that the occupant will be injured by the airbag itself.

Some more compact vehicles simply do not have the space to accommodate the bulk of currently available, side impact airbags. Seatbelts are somewhat effective in restraining forward motion of an occupant, as in a head-on collision, but they leave a person more or less unprotected from sideways motion. As a result, people in compact vehicles are now unable to obtain any significant protection from lateral impact and rollovers.

Unfortunately, even in vehicles large enough to hold side impact airbags, it is difficult to properly mount and hide the airbags in the vehicle. Airbags mounted in a visible, accessible location are to be avoided because they are unsightly and may be tampered with by children and others. Unfortunately, the bulk of current airbags makes it difficult to mount the airbags within the frame or interior paneling of the vehicle. Although suitable cavities may be formed in a steering wheel or dash board to receive an airbag module, it is far more difficult to create a similar amount of free space on the side of the vehicle without completely redesigning large portions of the vehicle. This increases the expense and inconvenience involved with the use of side impact airbags.

Additionally, many side impact airbags are incapable of protecting more than a single occupant without the use of additional gas sources or complex ducts to convey gas to multiple cushions. Use of multiple gas sources adds to the complexity of a vehicle because a suitable space must be formed for each gas source, and all gas sources must either have their own accelerometers, or they must have wiring routed to them from a common accelerometer. Routing ductwork through the doors or other portions of a vehicle is similarly inconvenient, because the ducts often intersect other essential components inside the vehicle frame. This adds to the expense and bulk of side airbag systems and often requires a vehicle manufacturer to make specific modifications in the design of the vehicle to accommodate the airbag. Furthermore, longer ducts restrict the flow of inflation gases, thereby creating a lag in the airbag's deployment. The speed at which side impact bags must open to provide effective protection makes any significant lag unacceptable.

Yet further, previously-known side impact airbags are expensive to produce and install. Most airbags are constructed either of a single piece of material, or two separate pieces of like material sewn together. Consequently, standard airbag material is used throughout, despite the fact that the user contacts only a portion of the airbag when it deploys. This tends to increase the cost and bulk of the airbag. For larger vehicles, in which the airbag must cover an impact surface of considerable size, side impact airbags may require a very large amount of material.

Accordingly, a need exists for a safety restraint apparatus capable of retaining gas for several seconds, as during a rollover. Furthermore, there is a need for a side airbag device that requires little space on the inside of the vehicle. Moreover, a need exists for a side airbag able to protect multiple occupants of a vehicle from side impact and rollovers without the use of several gas sources. A need further exists for an airbag that is simple in design and construction, so as to be producible at low cost.

BRIEF SUMMARY OF THE INVENTION

The apparatus of the present invention has been developed in response to the present state of the art, and in particular, in response to the problems and needs in the art that have not yet been fully solved by currently available safety restraint systems. In accordance with the invention as embodied and broadly described herein in the preferred embodiment, a novel side impact airbag for a vehicle is provided.

In one embodiment, the side impact airbag comprises a cushion portion connected to a source of pressurized gas via a supply tube fabricated separately from the cushion portion. The supply tube is preferably constructed of a pliable material, such as a plastic or fabric, and is preferably attached to the cushion portion by sewing, RF welding, adhesive bonding, or chemical bonding. The airbag may be arrayed along the inside of the vehicle roof, where the front door meets the frame of the vehicle. The supply tube may be mounted along the strut extending along the edge of the windshield. The source of pressurized gas, which may take the form of a canister of gas-producing material, may be mounted within the dashboard or engine compartment of the vehicle.

In an alternative embodiment, multiple cushion portions may be used to provide protection for additional passengers.

For example, a second cushion portion may be installed to the side of the rear seat and connected with the first cushion portion by a first sail portion. The first sail portion may be separately fabricated and attached to suitable ports on each cushion portion. When the first cushion portion inflates, gas travels through the first sail portion to inflate the second cushion portion as well. The first sail portion need not be made of standard airbag material, such as a fabric, but may be constructed of thin, air-retentive plastic.

Similarly, a third cushion portion may be installed to the side of an extra seat, behind the rear seat, as may be found in a minivan or sport utility vehicle. The third cushion portion may be connected to the second cushion portion by means of a second sail portion attached in similar fashion to the first sail portion. Additional cushion portions may be added and configured as needed, through the use of additional sail portions or other devices used to convey gas from one cushion portion to another.

The cushion and sail portions are preferably produced economically through modular construction. For example, "lay flat" construction involves the formation of components from substantially flat pieces of material. The cushion portions, for example, may be stamped or cut from a sheet of fabric, in the form of two symmetrical halves. The supply tube and/or sail portions may also be manufactured as two separate halves made from a sheet of fabric and subsequently attached. The cushion portion, the supply tube, and/or the sail portion may then be attached to each other, through methods such as chemical and adhesive bonding, sewing, and RF welding.

Modular assembly enables the use of different materials to form different parts of the airbag. The cushion portion, for example, receives the brunt of the passenger's impact, while the sail portion serves mainly to convey air to the cushion portion. Hence, the sail portion may be made thinner and lighter than the cushion portion. Hence, the entire airbag is cheaper and more compact.

Modular assembly is also beneficial because several different airbag configurations may be made with interchangeable parts. Thus, tooling for the airbag assembly line need not necessarily be changed to produce airbags for different vehicles; available components may simply be assembled differently to create the new configuration. Moreover, modular construction permits the creation of configurations that would be impossible to fabricate from a single piece of material. Additionally, flawed components do not require scrapping the entire airbag, only the flawed component.

Modular construction also makes the airbag more compact by adding flexibility in the design for different folding patterns. Airbags are typically installed in a tightly folded configuration to keep them compact and ensure that they deploy without catching on any obstacle. Through modular construction, airbags may be designed to fold evenly and with little unused space, even in the irregular, elongated spaces in which a side impact airbag may need to be installed.

The modular construction provides the flexibility to selectively coat certain parts of the airbag assembly. Interior surfaces of the first and second cushion portions maybe coated with a polymer, to improve their gas retention characteristics. The sail portion may be coated on the inside or outside as well. Preferably, the cushion portions have sail ports coated with a urethane-based coating on the inside, designed to bond to a similar coating on the outside of the sail portion through RF welding. The seams of the cushion portions and the sail portion may likewise be RF welded.

Struts may be provided inside the cushion portions to ensure that they inflate to the proper shape by forming parallel chambers in the cushion portions.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

Figure 1:
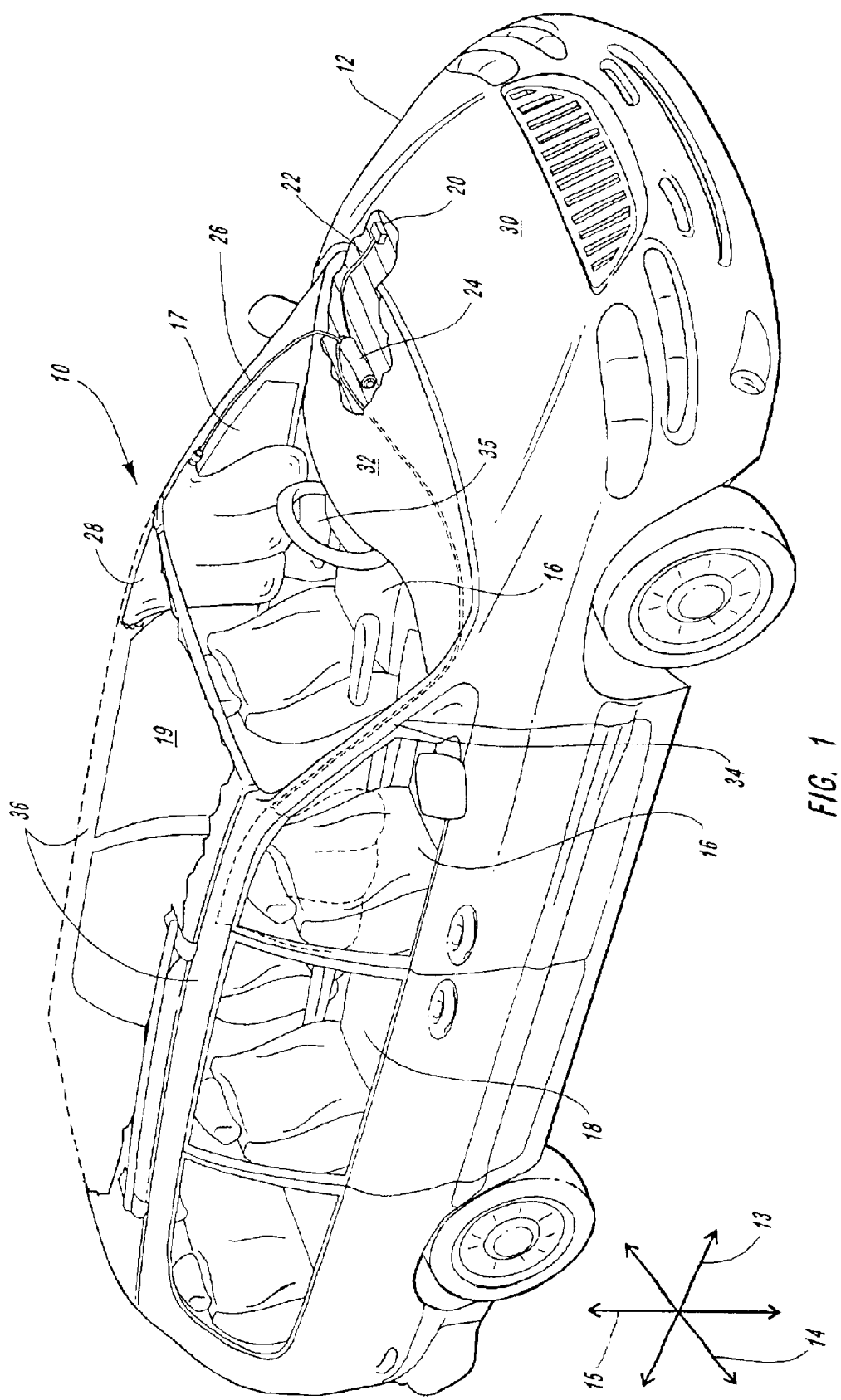
FIG. 1 is a perspective view of a vehicle incorporating one possible embodiment of a safety restraint apparatus according to the invention, with the first cushion portion in the inflated configuration.

Referring to FIG. 1, one possible embodiment of the safety restraint apparatus 10 is shown installed in a vehicle 12. The vehicle 12 has a longitudinal direction 13, a lateral direction 14, and a transverse direction 15. The vehicle 12 further has front seats 16 laterally displaced from a first lateral surface 17, or front door 17, as shown in the vehicle 12 of FIG. 1. The vehicle 12 also has rear seats 18, laterally displaced from a second lateral surface 19, or front door 19, as depicted.

An accelerometer 20 detects sudden lateral acceleration (or deceleration) of the vehicle 12, and transmits an electric signal via an electric line 22 to a source 24 of pressurized gas. The source 24 preferably takes the form of a canister 24 of chemically reactive material that initiates a rapid pressure surge in the canister 24 upon application of electricity. The expanding gases travel through a supply tube 26 to inflate a first cushion portion 28 situated between a driver and the front door 17. The entire process occurs with such rapidity that, before the vehicle has fully reacted to the impact, the first cushion portion 28 has inflated to protect a driver from impact against the front door 17.

The apparatus 10 is preferably unobtrusively mounted within the vehicle 12. The accelerometer 20 and canister 24 may be stowed within an engine compartment 30 or dashboard 32 to keep them away from users who might tamper with them. The supply tube 26 may extend along or within a strut 34 framing the windshield 35 to reach the first cushion portion 28, which may be installed along a top rail 36 over the front door 17. The apparatus 10 is preferably installed on both sides of the vehicle 12, so as to protect against impacts in either of the lateral directions 14.

Figure 2:
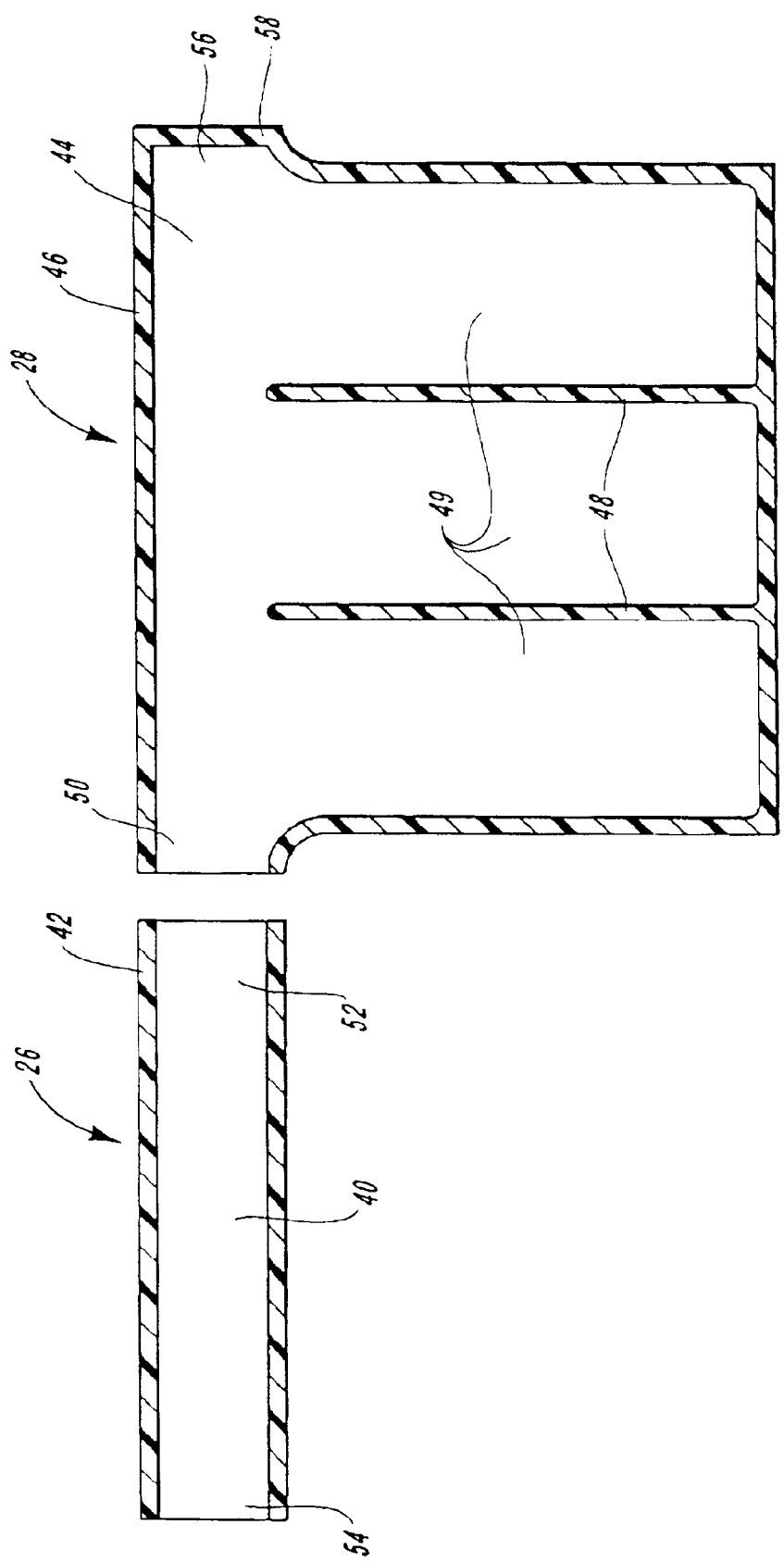
FIG. 2 is a cross sectional view of the first cushion portion and supply tube of the embodiment of FIG. 1.

Referring to FIG. 2, one embodiment of the present invention is illustrated. As set forth in FIG. 2, the supply tube 26 and first cushion portion 28 of the present invention are shown in cross section. The supply tube may have an interior 40 and an exterior seam 42. The supply tube 26 is preferably made from two separate, substantially rectangular pieces attached at the seams 42 to form a semi-tubular shape. The seam 42 may be formed by any suitable attachment method, including but not limited to adhesive bonding, chemical bonding, heat welding, RF welding, sewing, and swaging.

The first cushion portion 28 also has an interior 44 and a seam 46, and is preferably fabricated in similar fashion, i.e. by attaching two substantially flat pieces of material though a suitable attachment method. Struts 48 may also be formed in the first cushion portion 28 to create distinct chambers 49, each of which will hold gas. This extends the first cushion portion 28 to cover a greater longitudinal area, while limiting lateral inflation of the cushion to avoid impinging upon vehicle occupants during inflation. The struts 48 may be separately attached to the interior 44, or may simply be made by attaching opposite sides of the interior 44 together. Although two struts 48 are shown, more or fewer struts 48 may be used to form more or fewer chambers 49, as required to suit the dimensions of the vehicle 12.

Optionally, the interior 44 of the first cushion portion 28 may be coated, in part or entirely, with a polymeric substance. This improves the gas retention capability of the first cushion portion 28 to keep the first cushion portion 28 inflated during a rollover. The supply tube 26 may be similarly coated on the inside or outside. The supply tube 26 is preferably made from a lighter weight, cheaper material than that used to form the first cushion portion 28. A thin, yet sturdy and gas-retentive plastic, for example, would be an ideal material for the supply tube.

The first cushion portion 28 may have a tube port 50 characterized by a small portion of the outer periphery of the first cushion portion 28 on which no seam 46 is formed. The tube port 50 may further comprise an extension of the first cushion portion 28, designed for simple connection to a first end 52 of the supply tube 26. A second end 54 of the supply tube 26 may then be connected to the canister 24. A first sail port 56 may also exist in the first cushion portion 28 as initially formed, but the first sail port 56 may be closed by a weld 58 to retain gas in the first cushion, exclusive of additional connecting members. Consequently, the first cushion portion 28 may be formed as a module usable for either single or multiple cushion embodiments, and may then be adapted to suit the desired embodiment.

The embodiment shown in FIG. 2 is especially well-suited to "lay flat" construction. As alluded to previously, a portion of fabric, shaped as shown in FIG. 2, may be cut, stamped, or otherwise fabricated from a sheet of material, such as fabric, and welded to a similar (or even identical) shaped portion of fabric to create the first cushion portion 28. Exterior seams 46 form a gas seal for inflation of the first cushion portion 28, while interior seams, in the form of struts 48, maintain a degree of flatness in the inflated first cushion portion.

Fabrication of the supply tube 26 takes place in similar fashion. The rectangular pieces that are attached together to form the supply tube 26 may be cut, stamped, or otherwise fabricated from a sheet of material, which may be a fabric or a thin, gastight plastic. Some or all of the supply tube 26 may optionally be made from a strong fabric to ensure that the supply tube 26 remains firmly connected to and tightly sealed about the canister (not shown) during deployment.

Modular construction for several different vehicles may be carried out by making the first cushion portion 28 in a number of standardized sizes. For example, the first cushion portion 28 may be created with three chambers 49, as depicted in FIG. 2, and also with two, four, or five chambers 49 for different-sized lateral surfaces 17. First cushion portions 28 may also be produced in different overall sizes for installation in compact as well as larger vehicles. The supply tube 26 may also be made in a plurality of different sizes to suit several different vehicles. As mentioned above, the first sail port 56 may be opened for attachment of additional cushion portions, so that the same first cushion portion 28 may be adapted for single or multiple cushion configurations.

Figure 3:
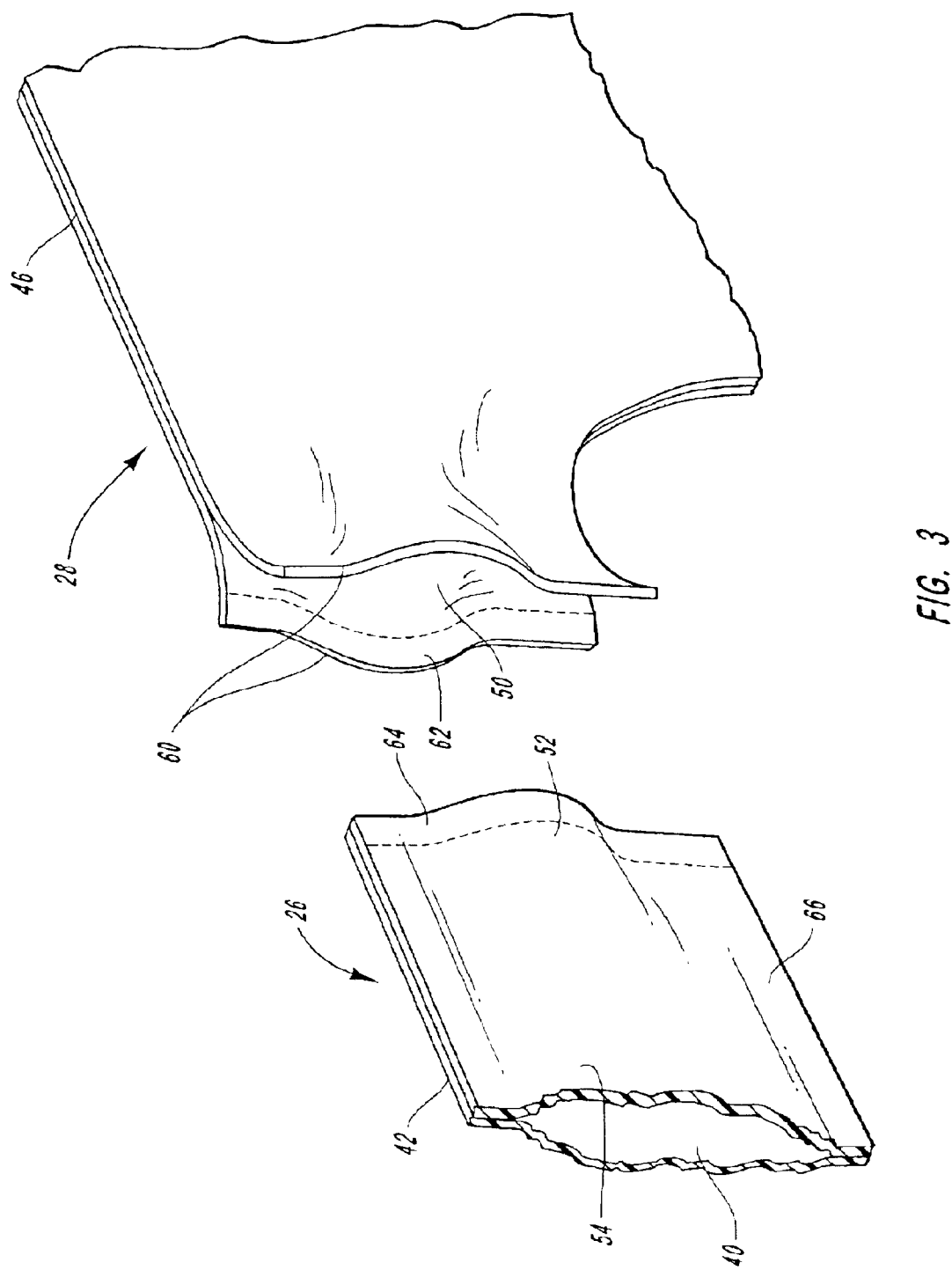
FIG. 3 is a perspective, cutaway view of the first cushion portion and supply tube of the embodiment of FIG. 1.

Referring to FIG. 3, the connection between the supply tube 26 and the first sail portion 28 is shown in greater detail. The tube port 50 may have flaps 60 designed to enclose the first end 52 of the supply tube 26. An attachment surface 62 inside the tube port 50 may then be affixed and sealed to a corresponding attachment surface 64 on the first end 52 of the supply tube 26. Any known means of attachment may be used, but adhesive bonding, chemical bonding, sewing, and RF welding are presently preferred.

RF welding, or radio frequency welding, is especially useful for bonding plastics. In order to RF weld two plastic surfaces, the surfaces are abutted against each other, and then radio frequency electromagnetic radiation is applied over the overlapping surfaces. The radiation excites the material to create an intermolecular bond. RF welding is uniquely effective with urethane based plastics. However, other materials, such as the material used to substantially form the first cushion portion 28, remain unaffected by the electromagnetic energy.

Consequently, coating the interior 44 of the first cushion portion 28 and the outer surface 66 of the supply tube 26 with plastic, especially a urethane based plastic, becomes doubly useful. The first end 52 of the supply tube 26 may be placed inside the tube port 50, and the entire tube port may be bombarded with radio frequency electromagnetic waves. As long as the interior 40 of the supply tube 26 is not coated or constructed of an RF weldable material, the supply tube 26 will remain open to gas flow while the attachment surfaces 62 and 64 are welded. This will still be effective even if only the attachment surfaces 62 and 64 are coated. The seams 42, 46 and struts 48 may also be created by RF welding.

RF welding is especially useful in conjunction with lay flat construction. It is a simple matter to pass an RF die over two flat, aligned pieces of material to form an exterior seam 42 or 46. A smaller die may be used to improve the accuracy and consistency of the exterior seams 42, 46. The urethane coating may be carefully positioned to ensure that the exterior seams 42, 46 are formed only in the proper places. Other attachment methods, such as chemical or adhesive bonding and sewing, may also be utilized in conjunction with lay flat construction.

Figure 4:
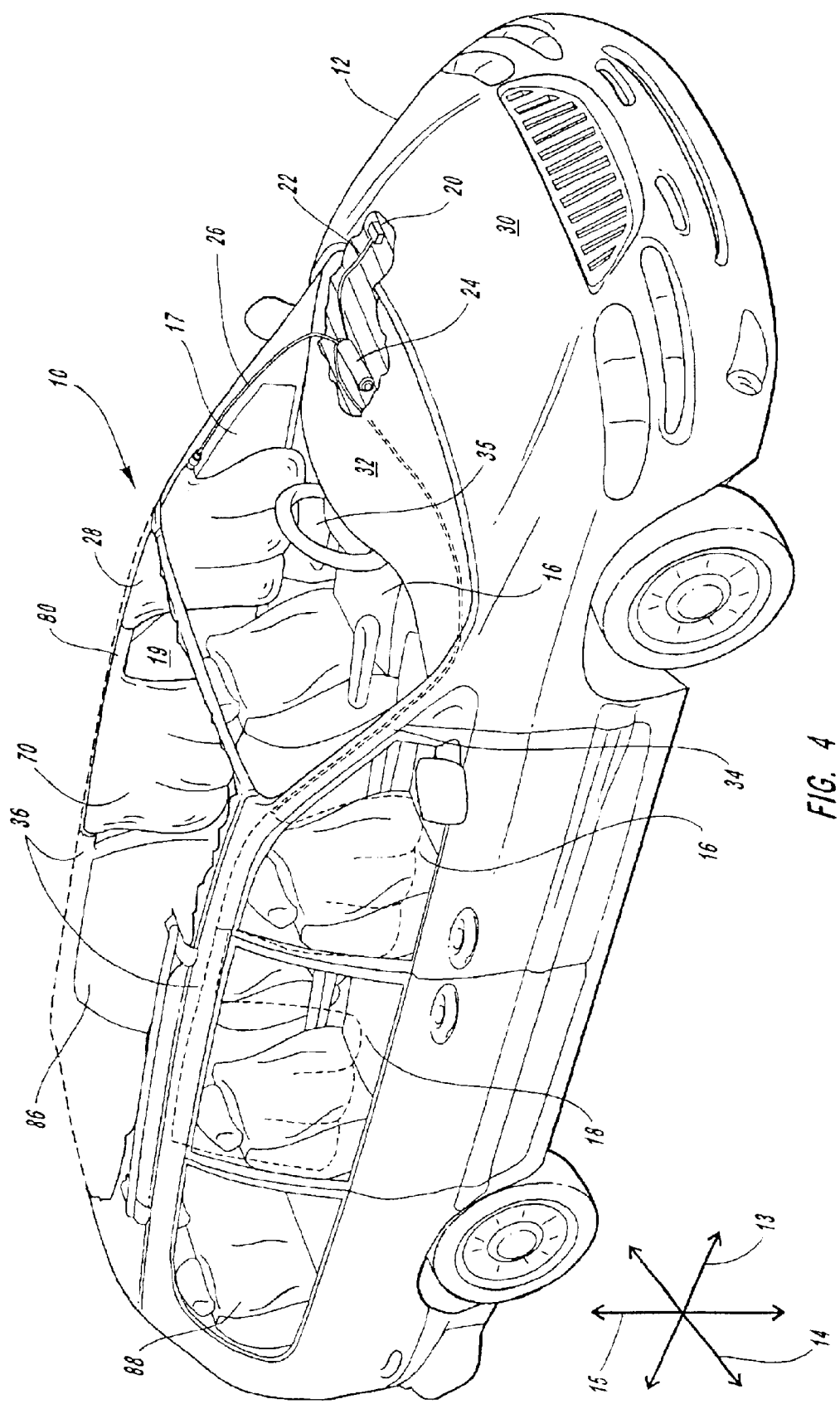
FIG. 4 is a perspective view of a vehicle incorporating another embodiment of a safety restraint apparatus according to the invention, with first and second cushion portions in the inflated configuration.

Referring to FIG. 4, an alternative embodiment of the invention is shown, with a second cushion member 70 arranged behind the first cushion member 28. The second cushion member 70 inflates nearly simultaneously with the first cushion member 28 in the event of a collision in the lateral direction 14 to protect passengers in the rear seats 18 from impact against the rear door 19.

Figure 5:
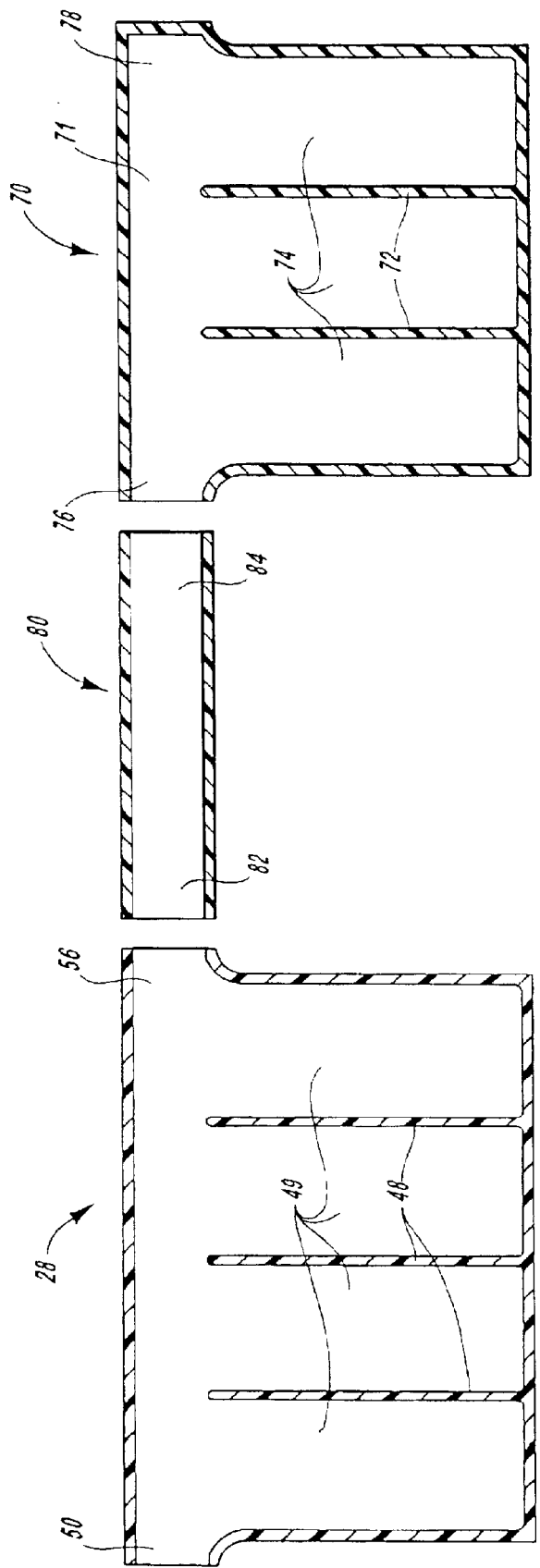
FIG. 5 is a side elevation, cross sectional view of the first and second cushion portions and the supply tube of the embodiment of FIG. 4.

Referring to FIG. 5, the embodiment of FIG. 4 is more specifically shown. The second cushion portion 70 may have an interior 71, struts 72, and chambers 74 similar to those of the first cushion portion 28. The second cushion portion may also have a second sail port 76 for receiving gas, and a third sail port 78 for further conveying air to a third cushion portion (not shown). A first sail portion 80 having first and second ends 82 and 84 may be connected to convey air between the first and second cushion portions 28 and 70. More specifically, the first sail port 56 may be left open for attachment to the first end 82 of the first sail portion. The second end of the first sail portion 80 may be attached to the second sail port 76. These attachments may be made as described above in connection with the first embodiment, or by any other suitable method.

The first sail portion 80 may have any configuration adapted to be readily attached to the first and second sail ports 56, 76, while remaining open to a flow of gas through the first sail portion 80. Like the supply tube 26 described above, the first sail portion 80 may be made from a lighter, thinner material than that used to form the first and second cushion portions 28, 70, and is preferably fabricated from overlaid, substantially rectangular sheets of material. In this embodiment, the supply tube 26 may be separately fabricated and attached to the first cushion portion 28, or may be formed unitary with the first cushion portion 28. In FIG. 5, the first cushion portion 28 has been shown with three struts 48 forming four chambers 49. However, as with the previous embodiment, the number of struts 48, 72 may be varied to suit the dimensions of the vehicle 12. As above, the first and second cushion portions 28, 70 are preferably arrayed along both sides of the vehicle 12 to provide protection against impacts in either lateral direction 14.

Furthermore, additional cushion portions may be added as needed, through the use of additional sail portions. For example, the vehicle 12 of FIG. 4 may have a third lateral surface 86 behind the second lateral surface 19. The third lateral surface 86 may face a set of extra seats 88 behind the rear seats 18. If desired, the apparatus 10 of the present invention may be extended further rearward to protect occupants of the extra seats 88 from impact against the third lateral surface 86.

Figure 6:
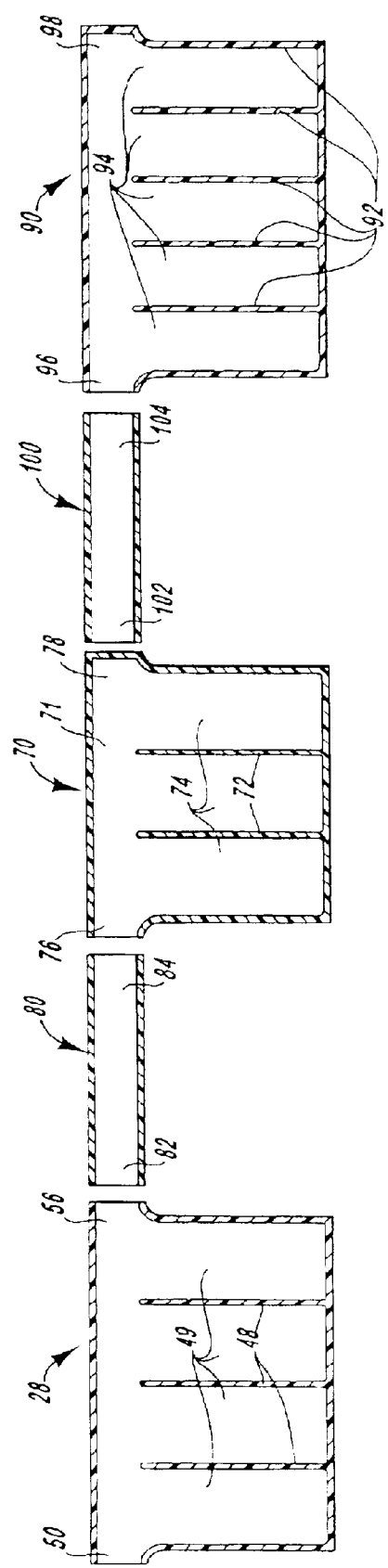
FIG. 6 is a side elevation, cross sectional view of another embodiment of a safety restraint apparatus according to the invention, with first, second and third cushion portions.

Referring to FIG. 6, a three-cushion embodiment suitable for protecting passengers of the extra seats 88 is shown. A third cushion portion 90 may be attached behind the second cushion portion 70. The third cushion portion 90 may be installed along the top rail 36 in similar fashion to the first and second cushion portions 28, 70. However, the third cushion portion 90 may be installed over the third lateral surface 86 and thus be configured to inflate downward to cover the third lateral surface 86.

Like the first and second cushion portions 28, 70, the third cushion portion 90 may have struts 92 tending to separate the cushion portion 90 into longitudinally-connected chambers 94. Thus, the third cushion portion 90 may also inflate into a somewhat flat shape. Depending on the dimensions of the third lateral surface 86, the third cushion portion 90 may be made longer or shorter than the first and second cushion portions 28, 70 to fully protect occupants of the extra seat 88. The third cushion portion 90 depicted in FIG. 6 has four struts 92, which may be formed integrally with the third cushion portion 90 by RF welding or any other desired method.

Preferably, whichever size is chosen for the third cushion portion 90, the third cushion portion 90, like the first and second cushion portions 28, 70, is of a standardized size and shape that may easily be adapted to multiple configurations and vehicles. The third cushion portion 90 may be substantially manufactured through lay-flat construction, using a convenient attachment method such as RF welding.

The third cushion portion 90 may also have a fourth sail port 96 and a fifth sail port 98, both of which may be initially manufactured in the open configuration. The fifth sail port 98 may then be sealed through RF welding or a similar process. Alternatively, the fifth sail port 98 may remain open for attachment of further componentry, such as cushion portions for the opposite side of the vehicle or for a rear surface of the vehicle, an additional supply tube, or the like.

In order to provide for gas flow between the third cushion portion 90 and the second cushion portion 70, the third sail port 78 may be left open. A second sail portion 100 may then be attached to convey gas from the second cushion portion 70 to the third cushion portion 90. More specifically, a first end 102 of the second sail portion 100 maybe attached to the third sail port 78 through any desired method. However, as depicted in FIG. 3, in connection with the supply tube 26, RF welding may be well-suited for providing a gastight seal between the third sail port 78 and the first end 102, while still permitting gas to flow through the attached portion. A second end 104 of the second sail portion 100 may similarly be attached to the fourth sail port 96.

As with the first and second cushion portions 28, 70 and the first sail portion 80, the third cushion member 90 and the second sail portion 100 may be coated with a urethane-based material in preparation for RF welding. More specifically, contact surfaces of the first and second ends 102, 104 of the second sail portion 100 and the fourth and fifth sail ports 96, 98 of the third cushion portion 90 may be coated for attachment or sealing. Alternatively, the second sail portion 100 and the third cushion portion 90 may be coated entirely, on an interior surface, an exterior surface, or both, with a urethane-based material to facilitate attachment by RF welding and improve gas retention.

Modular construction may be applied to such multiple-cushion configurations to greatly enhance the design flexibility of the apparatus 10. Airbags may be constructed to suit a variety of different vehicles, and even different configurations within the same vehicle, without adding a great deal of tooling expense. Configurations that are not even feasible to produce through unitary construction may be utilized to improve side impact protection, and extend that protection to all occupants of a vehicle.

Many of the problems associated with prior art safety restraint systems are addressed by the teachings of the present invention. From the above discussion, it will be appreciated that the present invention provides a novel safety restraint apparatus that effectively protects occupants of a vehicle from sudden lateral motion, whether of short duration or prolonged, by decreasing the gas permeability of the cushion portions. The cushion portions are compactly and easily connected to an air source and, where applicable, to each other. Furthermore, compact and inexpensive materials may be used to form connecting members. All of this is accomplished without the use of expensive, customized ductwork or additional gas sources. The apparatus 10 of the present invention is well suited to inexpensive, modular production for use with a large variety of vehicles and configurations.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A safety restraint apparatus for protecting occupants of a vehicle, the apparatus comprising:
   a first cushion portion having deflated and inflated configurations, the first cushion portion being adapted to receive gas from a source of pressurized gas;
   a second cushion portion having deflated and inflated configurations;
   a first sail portion connected between the first and second cushion portions, the first sail portion being adapted to provide passage of gas from the first cushion portion into the second cushion portion;
   wherein the first cushion portion is positioned proximate a first lateral surface of the vehicle in the inflated configuration, so as to protect an occupant of a front seat of the vehicle from lateral impact, and the second cushion portion is positioned proximate a second lateral surface of the vehicle in the inflated configuration, so as to protect an occupant of a rear seat of the vehicle from lateral impact, and each of said first and second cushion portions are fabricated separately from the first sail portion; and
   wherein the first cushion portion comprises a first sail port, a first end of the first sail portion being attached to the first sail port;
   wherein the first sail portion is fabricated substantially of a material different from that used to substantially fabricate the first and second cushion portions.

2. The apparatus of claim 1, wherein the second cushion portion comprises a second sail port, a second end of the first sail portion being attached to the second sail port.

3. The apparatus of claim 2, wherein the first sail portion is attached to the first and second sail ports by an attachment method chosen from the group consisting of sewing, RF welding, chemical bonding, and adhesive bonding.

4. The apparatus of claim 3, wherein the first sail portion is RF welded to the first and second sail ports.

5. The apparatus of claim 2, wherein the first sail portion forms a substantially gastight seal with the first and second sail ports, thereby maintaining the first and second cushion portions substantially in the inflated configuration during a rollover of the vehicle.

6. The apparatus of claim 1, wherein the first and second cushion portions each comprise a polymer coating covering at least a portion of an inner surface of the first and second cushion portions;
   the first sail portion comprises a polymer coating covering at least a portion of an outer surface thereof; and
   wherein portions of the polymer coatings of the first and second cushion portions are RF welded to mating portions of the polymer coating of the first sail portion.

7. The apparatus of claim 1, further comprising:
   a third cushion portion having deflated and inflated configurations;
   a second sail portion connected between the second and third cushion portions, the second sail portion being adapted to provide passage of gas from the second cushion portion into the third cushion portion; and
   wherein the third cushion portion is positioned proximate a third lateral surfaced of the vehicle in the inflated configuration, so as to protect an occupant of an extra seat of the vehicle from lateral impact, and the third cushion portion and the second sail portion are each fabricated separately from each other and from the first cushion portion, the second cushion portion, and the first sail portion, and the second sail portion is RF welded to the second and third cushion portions.

8. A safety restraint apparatus for protecting occupants of a vehicle, the apparatus comprising:
   a first cushion portion having deflated and inflated configurations, the first cushion portion being adapted to receive gas from a source of pressurized gas, the first cushion portion further being positioned proximate a first lateral surface of the vehicle in the inflated configuration, so as to provide protection from lateral impact;
   a second cushion portion having deflated and inflated configurations, the second cushion portion being positioned proximate a second lateral surface of the vehicle in the inflated configuration, so as to provide protection from lateral impact;
   a first sail portion connected between the first and second cushion portions, the first sail portion being attached to the first and second cushion portions in substantially gastight fashion to provide passage of gas from the first cushion portion into the second cushion portion;
   wherein the first sail portion is fabricated separately from the first and second cushion portions, the first sail portion being attached to the first and second cushion portions, and the first and second cushion portions each comprise a polymer coating covering at least a portion of an inner surface of the first and second cushion portions, the polymer coatings of the first and second cushion portions each being RF welded to a corresponding polymer coating on an outer surface of the first sail portion;
   wherein the first sail portion is fabricated substantially of a material different from that used to substantially fabricate the first and second cushion portions.

9. A safety restraint apparatus for protecting occupants of a vehicle, the apparatus comprising:
   a source of pressurized gas;
   a first cushion portion having deflated and inflated configurations, the first cushion portion being adapted to receive gas from the source, the first cushion portion comprising a polymer coating covering at least a portion of an inner surface of the first cushion portion being positioned proximate a first lateral surface of the vehicle in the inflated configuration, so as to protect an occupant of a front seat of the vehicle from lateral impact;

a supply tube comprising a polymer coating covering at least a portion of an outer surface of a first end of the supply tube, the supply tube being connected between the first cushion portion and the source and adapted to provide a substantially unrestricted flow of gas therebetween, the supply tube being fabricated separately from the first cushion portion and formed of a substantially flexible material; and wherein the supply tube is attached to the first cushion portion by an attachment method chosen from the group consisting of sewing, RF welding, chemical bonding, and adhesive bonding;

wherein the first cushion portion and the supply tube are substantially constructed of different materials.

10. The apparatus of claim 9, wherein the polymer coatings of the first cushion portion and the supply tube comprise a urethane-based substance.

11. The apparatus of claim 9, wherein a portion of the polymer coating of the first cushion portion is RF welded to a mating portion of the polymer coating of the supply tube.

12. A method for manufacturing a safety restraint apparatus for a vehicle, the method comprising:

providing a first cushion portion adapted to receive and retain pressurized gas, the first cushion portion having a first sail port;

providing a second cushion portion adapted to receive and retain pressurized gas, the second cushion portion having a second sail port;

providing a first sail portion adapted to permit passage of gas between first and second ends of the first sail portion; and connecting the first sail portion to the first and second cushion portions to form an integral safety restraint apparatus adapted to provide side impact protection for an occupant of the vehicle;

wherein connecting the first sail portion to the first and second cushion portions comprises attaching the first end of the first sail portion to the first sail port and attaching the second end of the first sail portion to the second sail port;

wherein the first sail portion is fabricated substantially of a material different from that used to substantially fabricate the first and second cushion portions.

13. The method of claim 12, wherein the first and second ends of the first sail portion are attached to the first and second sail ports by an attachment method chosen from the group consisting of sewing, RF welding, chemical bonding, and adhesive bonding.

14. The method of claim 12, further comprising forming a polymer coating covering an inner surface of each of the first and second cushion portions, an outer surface of a first end of the first sail portion and an outer surface of a second end of the first sail portion.

15. The method of claim 14, wherein connecting the first sail portion to the first and second cushion portions comprises RF welding portions of the polymer coatings of the first and second cushion portions to mating portions of the polymer coatings of the first and second ends of the first sail portion.

16. The method of claim 12, further comprising:
providing a third cushion portion adapted to receive and retain pressurized gas;

providing a second sail portion adapted to permit passage of gas between first and second ends of the second sail portion; and connecting the second sail portion to the second and third cushion portions.

17. The method of claim 16, wherein connecting the second sail portion to the second and third cushion portions comprises RF welding a first end of the second sail portion to the second cushion member and RF welding a second end of the second sail portion to the third cushion member, such that the third cushion portion may receive gas from the second cushion portion.

18. The safety restraint apparatus of claim 1, wherein the first end of the first sail portion is attached to overlap the first sail port.

19. A safety restraint apparatus for protecting occupants of a vehicle, the apparatus comprising:

a first cushion portion adapted to receive gas from a source of pressurized gas, the first cushion portion comprising a first sail port having an attachment surface, wherein the first cushion is disposable to inflate proximate a first lateral surface of the vehicle to provide lateral impact protection;

a first sail comprising a first end and a second end, wherein the first end comprises an attachment surface RF welded to the attachment surface of the first sail port to enable the first sail portion to convey gas from the first cushion portion to a second cushion portion disposable to inflate proximate a second lateral surface of the vehicle to provide lateral impact protection;

wherein the first cushion portion and the first sail are substantially constructed of different materials.

20. The safety restraint apparatus of claim 19, wherein the second end of the first sail portion comprises an attachment surface, the safety restraint apparatus further comprising a second cushion portion comprising second sail port having an attachment surface attached to the attachment surface of the second end of the first sail portion.

21. The method of claim 12, wherein attaching the first end of the first sail portion to the first sail port comprises overlapping the first end of the first sail portion with the first sail port.

22. A method for manufacturing a safety restraint apparatus for a vehicle, the method comprising:

providing a first cushion portion adapted to receive gas from a source of pressurized gas, the first cushion portion comprising a first sail port having an attachment surface, wherein the first cushion is disposable to inflate proximate a first lateral surface of the vehicle to provide lateral impact protection;

providing a first sail portion comprising a first end and a second end, wherein the first end comprises an attachment surface; and RF welding the attachment surface of the first end of the first sail portion to the attachment surface of the first sail port to enable the first sail portion to convey gas from the first cushion portion to a second cushion portion disposable to inflate proximate a second lateral surface of the vehicle to provide lateral impact protection;

wherein the first sail portion is fabricated substantially of a material different from that used to substantially fabricate the first cushion portion.

23. The method of claim 22, wherein the second end of the first sail portion comprises an attachment surface, the method further comprising:

providing a second cushion portion comprising a second sail port having an attachment surface; and attaching the attachment surface of the second end of the first sail portion to the attachment surface of the second sail port of the second cushion.

24. A safety restraint apparatus for protecting occupants of a vehicle, the apparatus comprising:

a first cushion portion having deflated and inflated configurations, the first cushion portion being adapted to receive gas from a source of pressurized gas;

a second cushion portion having deflated and inflated configurations;

a first sail portion connected between the first and second cushion portions, the first sail portion being adapted to provide passage of gas from the first cushion portion into the second cushion portion;

wherein the first sail portion is fabricated substantially of a material different from that used to substantially fabricate the first and second cushion portions.

25. The safety restraint apparatus of claim 24, wherein the first and second cushion portions each comprise a polymer coating covering at least a portion of an inner surface of the first and second cushion portions, the polymer coatings of the first and second cushion portions each being RF welded to a corresponding polymer coating on an outer surface of the first sail portion.

26. A method for manufacturing a safety restraint apparatus for a vehicle, the method comprising:

providing a first cushion portion adapted to receive and retain pressurized gas, the first cushion portion having a first sail port;

providing a second cushion portion adapted to receive and retain pressurized gas, the second cushion portion having a second sail port;

providing a first sail portion adapted to permit passage of gas between first and second ends of the first sail portion, wherein the first sail portion is fabricated substantially of a material different from that used to substantially fabricate the first and second cushion portions; and attaching the first end of the first sail portion to the first sail port and attaching the second end of the first sail portion to the second sail port to form an integral safety restraint apparatus.

27. The method of claim 20, wherein the first and second cushion portions each comprise a polymer coating covering at least a portion of an inner surface of the first and second cushion portions, wherein attaching the first end of the first sail portion to the first sail port and attaching the second end the first sail portion to the second sail port comprises RF welding each of the polymer coatings of the first and second cushion portions to a corresponding polymer coating on an outer surface of the first sail portion.

* * * * *